(12) United States Patent
Huang et al.

(10) Patent No.: US 8,595,700 B2
(45) Date of Patent: Nov. 26, 2013

(54) METHOD AND APPARATUS FOR REUSING COMPONENTS OF A COMPONENT-BASED SOFTWARE SYSTEM

(75) Inventors: He Yuan Huang, Beijing (CN); Shih-Gong Li, Beijing (CN); Hua Fang Tan, Beijing (CN); Wei Zhao, Beijing (CN); Jun Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1604 days.

(21) Appl. No.: 12/115,890

(22) Filed: May 6, 2008

(65) Prior Publication Data

US 2008/0295109 A1     Nov. 27, 2008

(30) Foreign Application Priority Data

May 22, 2007   (CN) .......................... 2007 1 0104852

(51) Int. Cl.
*G06F 9/44*         (2006.01)
(52) U.S. Cl.
USPC ........................................ 717/120; 718/106
(58) Field of Classification Search
USPC ........................................................ 717/120
See application file for complete search history.

(56) References Cited

U.S. PATENT DOCUMENTS

| | | | |
|---|---|---|---|
| 6,175,948 B1 * | 1/2001 | Miller et al. ................... | 716/105 |
| 6,847,981 B2 | 1/2005 | Song et al. | |
| 7,000,238 B2 * | 2/2006 | Nadler et al. ................. | 719/330 |
| 7,797,367 B1 * | 9/2010 | Gelvin et al. ................. | 709/200 |
| 2003/0055921 A1 | 3/2003 | Kulkarni et al. | |
| 2004/0054812 A1 | 3/2004 | Liang et al. | |
| 2005/0114644 A1 * | 5/2005 | Chu et al. .......................... | 713/2 |
| 2005/0138603 A1 | 6/2005 | Cha et al. | |
| 2005/0144226 A1 | 6/2005 | Purewal | |
| 2006/0041862 A1 | 2/2006 | Moussallam et al. | |
| 2007/0033580 A1 * | 2/2007 | Ringseth et al. .............. | 717/137 |
| 2007/0033640 A1 * | 2/2007 | Herness et al. ................... | 726/5 |

* cited by examiner

*Primary Examiner* — Henry Tsai
*Assistant Examiner* — John Roche
(74) *Attorney, Agent, or Firm* — Scully, Scott, Murphy & Presser, P.C.; Gail H. Zarick, Esq.

(57) ABSTRACT

The present invention provides a component reuse method for reusing at least first component that is selected from a first software system to a second software system. The method comprises the steps of: analyzing the first software system, determining dependencies of the at least one first component of the first software system and acquiring relevant interface information; generating surrogates based on the dependencies and the interface information, which will be deployed in the first operating environment and in the second operating environment respectively, wherein the surrogates allow the second software system to invoke service provided by the at least one first component in the first operating environment and allow the at least one first component to invoke relevant service provided in the second software system.

17 Claims, 6 Drawing Sheets

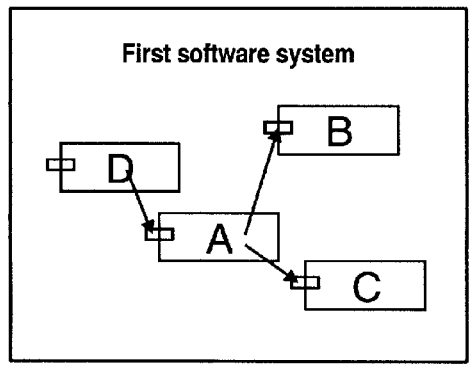
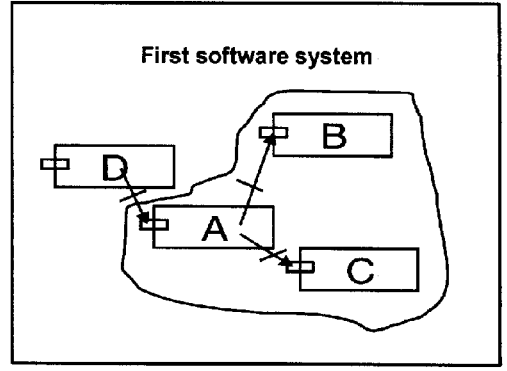
Fig. 3a        Fig. 3b
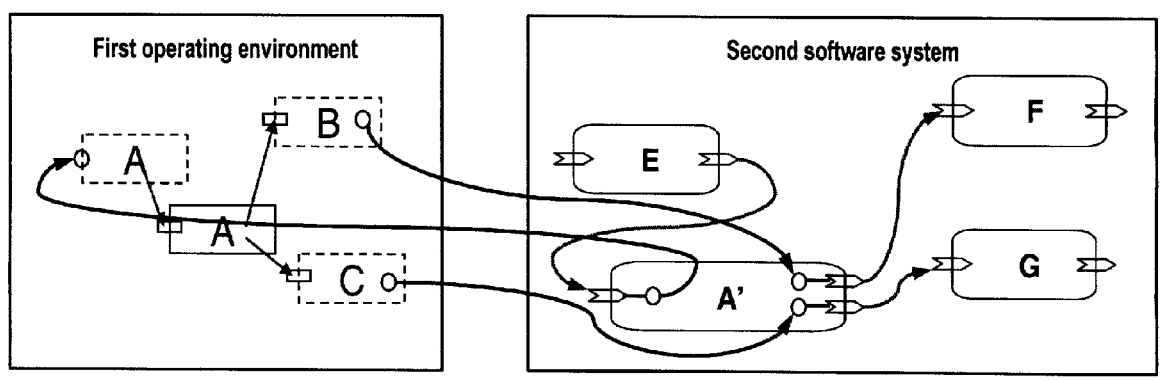
Fig. 3c

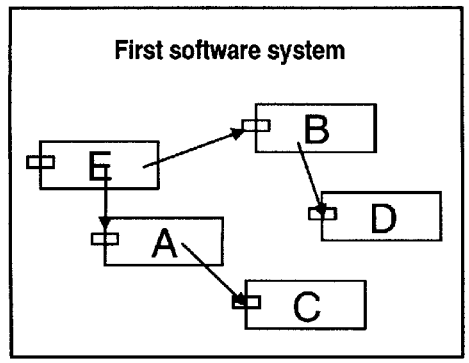
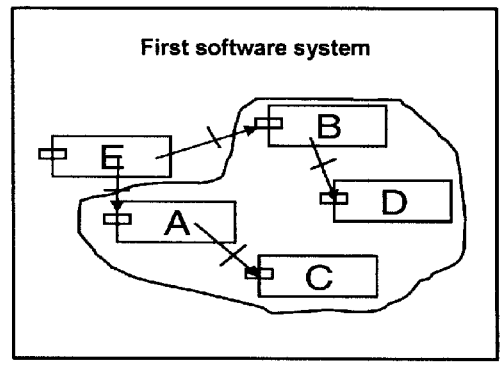
Fig. 4a          Fig. 4b
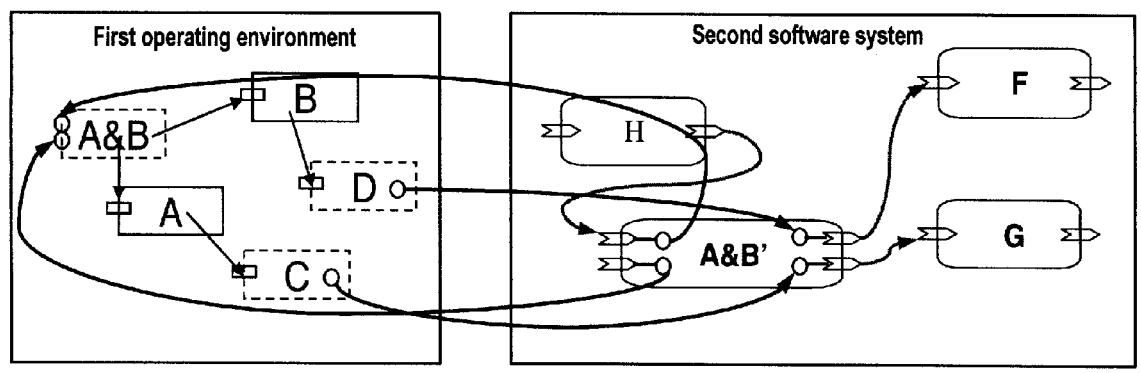
Fig. 4c

Adapter a

Adapter b

Adapter c

Adapter d

METHOD AND APPARATUS FOR REUSING COMPONENTS OF A COMPONENT-BASED SOFTWARE SYSTEM

CROSS-REFERENCE TO RELATED APPLICATIONS

This application claims priority under 35 U.S.C. §119 to Chinese Patent Application No. 200710104852.5 filed May 22, 2007, the entire content of which is specifically incorporated by reference herein.

FIELD OF THE INVENTION

The present invention relates to a component-based software system, and in particular, to a method and apparatus for reusing components of a component-based software system.

BACKGROUND OF THE INVENTION

In traditional component-based software systems, such as systems implemented by Enterprise Java Bean (EJB), Component Object Model (COM), Common Object Request Broker Architecture (CORBA), and so on, functions of components are exposed as interfaces, while the invocation dependencies among components are tangled with implementation code of components. For example, the invocation dependencies among components B and C are possibly tangled with implementation code of component A as shown in Table 1.

TABLE 1

Code in Component A

```
. . .
b = ServiceManager.locateService("B");
b.x( );
. . .
c = ServiceManager.locateService("C");
c.y( );
. . .
```

An emerging service-oriented component model, such as Service Component Architecture (SCA), introduces service-oriented concepts into the component model and execution environment thereof. For example, the SCA Assembly Model consists of a series of artifacts which define the configuration of an SCA system in terms of service components which implement and/or use services and connections (wires) and related artifacts which describe how they are linked together. Moreover, SCA aims to encompass a wide range of technologies for service components and for the access methods which are used to connect them. An input which is provided by a service component for other services to invoke the service component per se is called "interface," and an invocation output via which the service component per se invokes other services is called "reference."

Compared with traditional component-based software systems, an SCA-based software system externalizes the invocation dependencies among components, that is, a software system with externalized dependencies. In other words, in a software system with externalized dependencies, the invocation dependencies among components (such as "interface" and "reference" of SCA) are implemented by specific code, which is independent of that of components (e.g. a document in Extensible Markup Language (XML)). Consequently, in an SCA-based software system, for example, service required in component A could be provided by any component B that exposes its service. Thus, implementation code of component A could be linked with component B without any additional code.

If components implemented by traditional component technology could be "SCAlized," then these "SCAlized" components could be assembled with other SCA components without any additional code, thereby achieving the reusing of components implemented by traditional component technology. Moreover, these "SCAlized" components could benefit from management capabilities, such as monitoring, logging, and so on of an SCA-based software system.

In a broad sense, it is desired that the existing component-based system can be composed by advanced applications based on the service-oriented component model, that is, existing legacy systems are adapted to be integrated with novel technologies and platforms. One solution is wrapping the existing legacy systems with clearly defined interfaces according to the advanced specifications or standards which are followed by the applications in which the existing legacy systems will to be integrated. US Patent Application Publication No.: US 2003/0055921 is an example of this solution. In this invention, the whole Object-Oriented application is wrapped as an object facade which will communicate with new components in opposite integrated component-based application through a connectivity bus which can be any standard middleware. The other solution adds a light weight proxy between the legacy system and the applications with advanced technologies. The proxy plays a mediation role between the different protocols which does not force any one counterpart to comply with the other.

As an example, US Patent Application Publication No.: US 2006/0041862 develops an API library to enable the communication between the legacy systems and web services. Legacy systems need employ these APIs so as to be integrated with new systems. US Patent Application Publication No.: US 2004/0054812 focuses on the data integration between the legacy systems and other advanced applications.

However, both of the integration solutions cannot avoid modifying the original source code of traditional systems.

Additionally, in order to experience the advanced features brought from new technologies, porting legacy systems to new platforms (e.g. from Windows operating system to Linux operating system; from standalone Web server to J2EE application server) or with advanced technologies (e.g. from procedural paradigm to object-oriented paradigm) is always both a strong desire and a great concern for users of legacy systems. Understanding and transforming the original legacy system and redeploying the newly ported system are not only time-consuming but also error-prone mainly because the software engineers who perform the porting working are not the original developers. To facilitate the transformation of a legacy system, people have to devote a large amount of efforts in the literature and practice much in the real world to analyze and discover its corresponding high level design to guide the source code transformation.

Addressing this problem, one solution focuses on source code and documentation itself and employs static analysis technologies to abstract the high level designs of the target systems. US Patent Application Publication No.: U.S. Pat. No. 6,847,981 analyzes the Servlet code to extract the Web UI information, business logic/Java class information and SQL information. They synthesize this extracted information to generate the EJB code by an EJB component generator to transform a pure Web application to a J2EE component-based application. US Patent Application Publication No.: 2005/0144226 presents the systems and methods to generate open reusable, business components for Service-Oriented Architecture from existing client/server applications through decomposing them into separate user interface, business logic and event management layers. The different layers are wrapped as services and re-assembled to the open-standard based application. US Patent Application Publication No.: US2005/0138603 presents the migration process and working products of each step for migrating legacy systems to component-based applications. The key steps in this invention also relate to analyzing the source code, mining the components and transforming the original source code to component programs. Another solution relates to profiling, testing and observing systems' behaviors, including actual execution and inspecting execution traces. Although this kind of solution improves the efficiency of the legacy transformation, intensive manual work on source code transformation are not easily avoided.

It can be seen that all solutions reusing components of component-based software systems with existing technologies need to change internal implementation code of components.

SUMMARY OF THE INVENTION

To overcome the limitations of the prior art, the present invention provides a technical solution to reuse components of a component-based software system by externalizing dependencies among components without modifying component implementation.

According to an aspect of the present invention, there is provided a component reuse method for reusing at least one first component that is selected from a first software system in a second software system, wherein the first software system is a component-based software system operating in a first operating environment and the second software system is a software system operating in a second operating environment with externalized dependencies. The method comprises the steps of: analyzing the first software system, determining dependencies of the at least one first component of the first software system and acquiring relevant interface information; generating surrogates which will be deployed in the first operating environment and in the second software system respectively based on the dependencies and the interface information, wherein the surrogates allow the second software system to invoke service provided by the at least one first component in the first operating environment and allow the at least one first component to invoke relevant service provided in the second software system.

According to another aspect of the present invention, there is provided a system of supporting component reuse. The system comprises: component selection means for selecting from a first software system a first component that will be reused in a second software system, the first software system being a component-based software system operating in a first operating environment and the second software system being a software system operating in a second operating environment with externalized dependencies; analysis means for analyzing the first software system, determine dependencies of the at least one first component of the first software system and acquiring relevant interface information; generation means for generating surrogates which will be deployed in the first operating environment and in the second software system respectively based on the dependencies and the interface information, wherein the surrogates allow the second software system to invoke service provided by the first component in the at least one first operating environment and allow the at least one first component to invoke relevant service provided in the second software system.

According to a further aspect of the present invention, there is provided a computer program product for reusing at least one first component that is selected from a software system to a second software system, wherein the first software system is a component-based software system operating in a first operating environment and the second software system is a software system operating in a second operating environment with externalized dependencies. The computer program product is configured to implement a method according to the present invention.

Therefore, the technical solution according to the present invention leaves the flexibility for end users to select any possible candidate components to provide a service without concerning the componentization procedure. Through discovering component' references and interfaces and redirecting the invocation of these interfaces to corresponding surrogates, dependencies of a component to be reused are externalized, and the component can be reused by an SCA-based system with externalized dependencies. More advantageously, the technical solution according to the present invention avoids modifying the original source code of traditional component-based software systems.

Other features and advantages of the present invention will become more apparent from the following detailed description of embodiments of the present invention, when taken in conjunction with the accompanying drawings.

BRIEF DESCRIPTION ON THE DRAWINGS

In order to illustrate in detail features and advantages of embodiments of the present invention, the following will be with reference to the accompanying drawings. If possible, like or similar reference numerals designate the same or similar components throughout the figures thereof and description, in which FIG. 1 shows a processing flowchart of a method for reusing components of a component-based software system according to an embodiment of the present invention;

FIG. 2 schematically shows an architectural view of a system for reusing components of a component-based software system according to an embodiment of the present invention;

FIGS. 3a-3c show an example of selecting a first component from a first software system so as to reuse it in a second software system according to an embodiment of the present invention;

FIGS. 4a-4c show an example of selecting multiple first components from a first software system so as to reuse them in a second software system according to an embodiment of the present invention;

Figure 5:
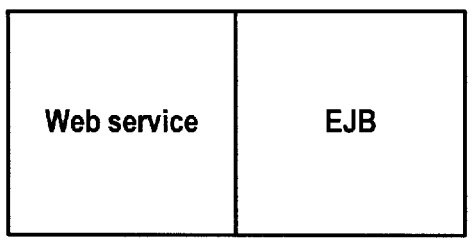
Figure 5:
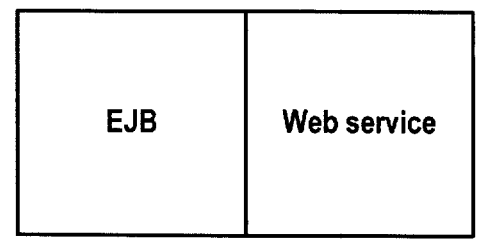
Figure 5:
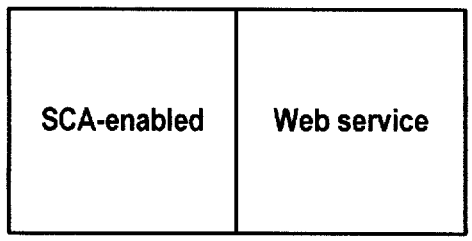
Figure 5:
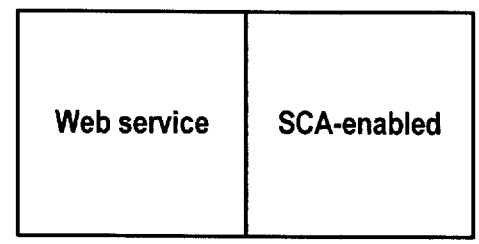
Figure 6:
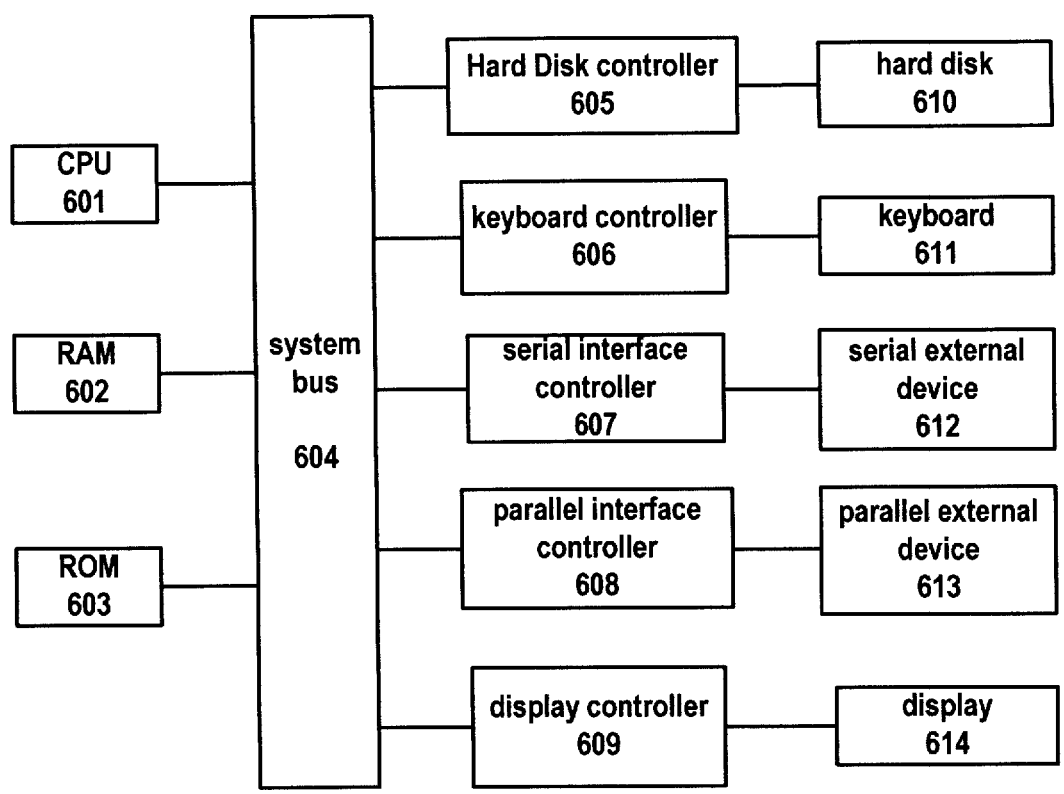

FIG. 5 schematically shows four types of adapters according to an embodiment of the present invention; and FIG. 6 schematically shows a computer device in which embodiments according to the present invention can be implemented.

DESCRIPTION OF THE PREFERRED EMBODIMENTS

Embodiments of the present invention will be illustrated in detail with reference to the accompanying drawings.

Figure 1:
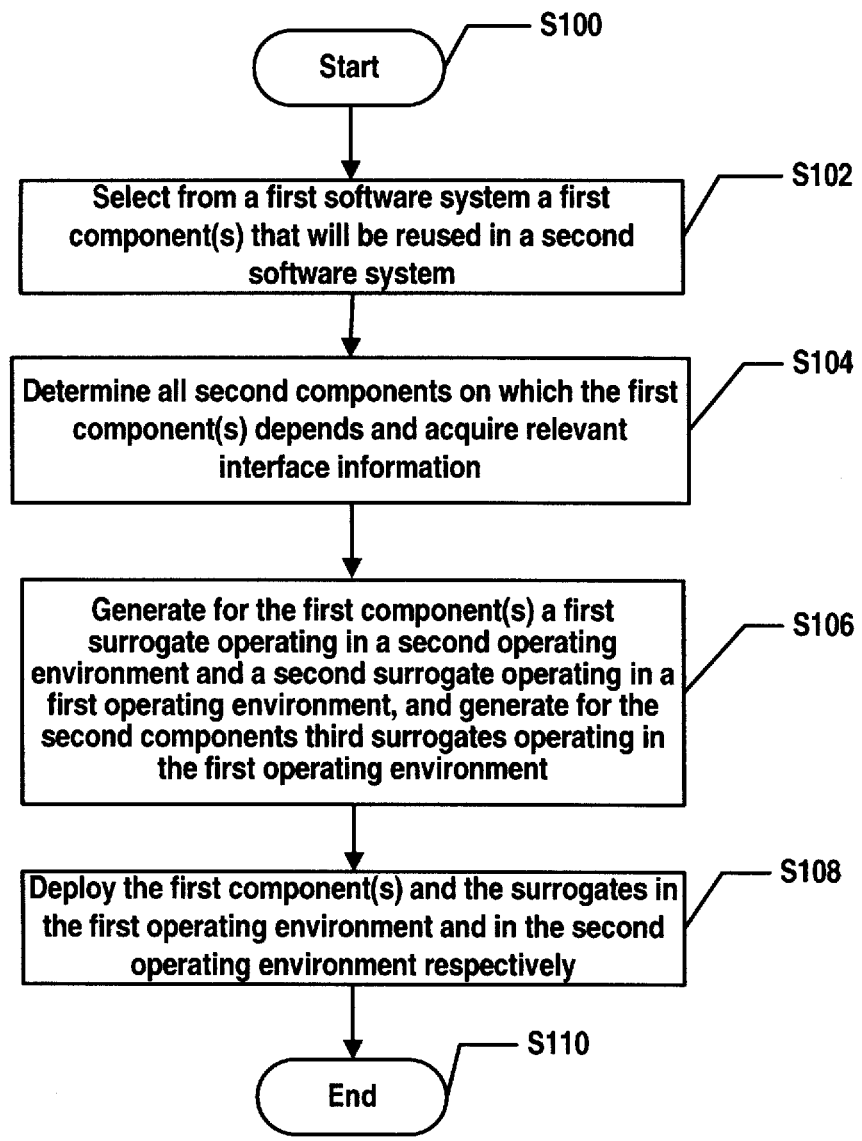

FIG. 1 shows a processing flowchart of a method for reusing components of a component-based software system according to an embodiment of the present invention, in which a component(s) of a first software system is reused in a second software system.

As shown in FIG. 1, the processing starts in step S100.

In step S102, a first component from a first software system that will be reused in a second software system is selected. In an example, the first software system may be a traditional component-based software system as described previously, whose operating environment is a first operating environment; the second software system may be an SCA-based software system with externalized dependencies, whose operating environment is a second operating environment. Users can select either a single component or multiple components that will be reused in the second software system as a first component(s) as their needs.

In step S104, dependencies of the first component(s) of the first software system are analyzed to determine components which the respective first component(s) depends on and mark them as second components. Additionally, the following interface information is at least acquired: information on interfaces for invoking the first components and information on interfaces referenced by the first components.

In step S106, based on the acquired information, generated are a first surrogate which is associated with the first component(s) and operates in the second operating environment, a second surrogate which is associated with the first components and operates in the first operating environment, and third surrogates which are associated respectively with the second components and operate in the first operating environment.

The first surrogate is a surrogate in the second software system for reused component(s) (the first component(s)). When the reused component(s) is invoked in the second software system, the first surrogate can receive a request for invocation, conduct protocol transformation on the request for invocation and subsequently redirect it to the second surrogate operating in the first operating environment. The second surrogate is a surrogate in the first software system for the reused component(s) (the first component(s)). The second surrogate forwards the received request for invocation to a corresponding component of the first component(s) through protocol conversion, so that this component can be implemented in the second operating environment. The third surrogate is a surrogate in the first operating environment of the components which the reused components depend on, namely the second components. During implementing the first component(s), if the first component(s) needs to invoke other components, i.e., the first component(s) depends on the second components, then each of their corresponding third surrogates receives a request for invocation and forwards it to the first surrogate in the second software system through protocol conversion. The first surrogate forwards the request for invocation to components respectively corresponding to the second components in the second software system through protocol conversion.

In step S108, the first component(s) to be reused and surrogates are deployed in the first operating system and the second operating system respectively. For example, the first component(s) and the respective surrogates may be packaged, and the packages thereof are then deployed respectively in the first operating environment and the second operating environment, thereby achieving the reusing of selected first component(s).

The processing ends in step S110.

It is to be understood that the performance sequence of the steps in FIG. 1 may differ from the foregoing description. For example, firstly, the components of the first software system may be analyzed to find dependencies and interfaces of part or all of the components (step S104), then the first component(s) to be reused is selected (S102). Preferably, the resulted dependencies may be presented to users in a graphical form, so that users can select first component(s) visually and learn of second components the selected first components depend on.

Figure 2:
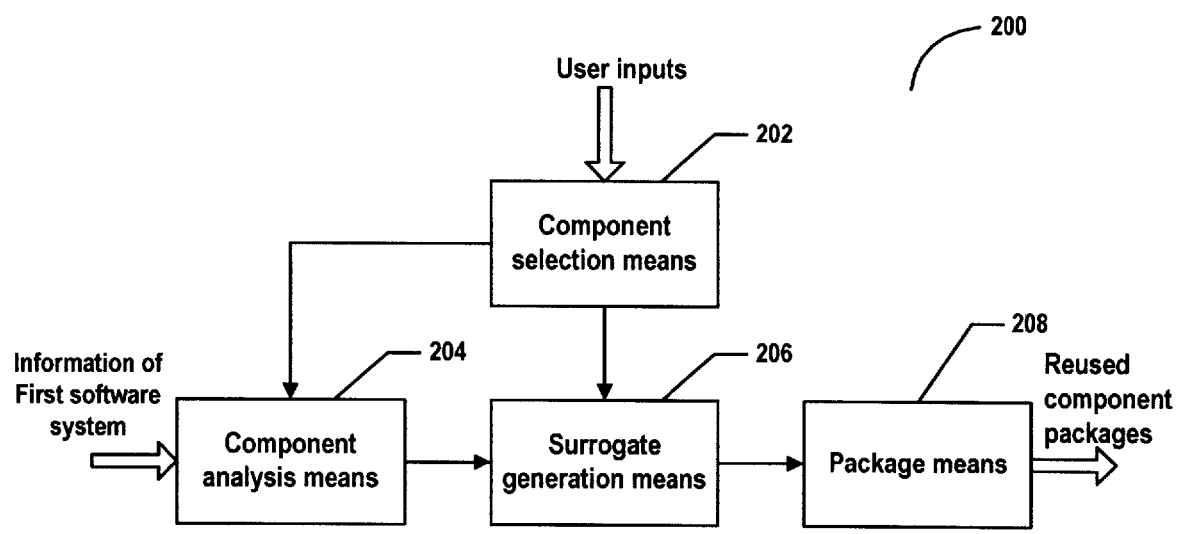

FIG. 2 schematically shows an architectural view of a system for reusing components of a component-based software system according to an embodiment of the present invention.

In this figure, reference numeral 200 denotes a system according to an embodiment of the present invention, for reusing components of a component-based software system; 202 component selection means for selecting from a first software system components to be reused; 204 analysis means for analyzing components of the first software system to acquire relevant information; 206 surrogate generation means for generating surrogates needed in reusing components of the first software system in a second software system; and 208 package means for packaging reused components and generated surrogates so as to deploy them respectively in the first and second operating environments.

As shown in FIG. 2, with component selection means 202, a component to be reused can be selected from a first software system, such as a traditional component-based system, as a first component. Those skilled in the art should appreciate that one or more components may be selected as the first components. Component selection means 202 may have for example a friendly user interface to visually provide users with information on components of the first software system, and users may use the user interface to select a component(s) to be reused, namely the first component(s) from the first software system.

Component analysis means 204 analyzes components of the first software system to acquire relevant information. Component analysis means 204 may analyze dependencies among components to determine the components which the first components depend on, namely the second components. As for information inputs needed by component analysis means 204, dependencies among components and interfaces of components of the first software system can be acquired in various ways. For example, one possible way is the tracing approach. Several scenarios for using the first software system are input; these scenarios will be parsed and executed by a scenario execution engine within the first software system; through the execution, an interaction tracer (which can be built on top of existing products like Tivoli) will be responsible for capturing all the interaction data among the components of the first software system; a dependency analyzer analyzes the interaction data and generates data indicating dependencies among components of the first software system, which at least indicates: a) a set of components with component interface definitions; and b) a set of dependencies that mainly represent the invocation relationship among components. Of course, it is to be appreciated that another more direct way is acquiring the design documents associated with the first software system directly. As such, information on dependencies among components and interfaces of components of the first software system can be acquired without performing the complicated analyzing step.

Surrogate generation means 206 automatically generates surrogates needed in reusing the first components in the second software system based on the information on the first components as provided by component selection means 202 and the information on the second components as provided by component analysis means 204. These surrogates will be integrated with components in the first operating environment of the first software system and components in the second operating environment of the second software system, thereby achieving the reusing of the first components in the second software system. More specifically, surrogate generation means 206 generates a first surrogate which is associated with the first component(s) and operates in the second operating environment, a second surrogate which is associated with the first component(s) and operates in the first operating environment, and third surrogates which are associated respectively with the second components and operate in the first operating environment. The second surrogate allows the invocation to the reused first components, whose name may be either the same as or different from that of the first components; the third surrogates are a surrogates representing the second components respectively, whose names need to be the same as those of corresponding second components; and the first surrogate has the same interfaces as the first component(s), which can redirect all the invocation to the first component(s) to the second surrogate of the first components. Moreover, the first surrogate may have interfaces which can be invoked by the third surrogates (if any) and redirect the invocation from the third surrogates to other components of the second software system which will provide services referenced by the first component(s).

Optionally, package means 208 will take the original component, the generated surrogates as inputs and generate two outputs: a composition package containing the first surrogate that will be deployed in the second operating environment and that can be used for composition with components of the second software system; and a deployment package that will be deployed in the first operating environment and that contains the first component(s) and the second and third surrogates.

How to reuse in the second software system components selected from the first software system according to the present invention will be described in conjunction with concrete examples.

FIGS. 3a-3c show an example of selecting a first component from a first software system so as to reuse it in a second software system according to an embodiment of the present invention. FIG. 3a schematically shows an example of the first software system; FIG. 3b identifies the selected first component and the second components it depends on; FIG. 3c schematically shows a procedure of reusing the first component in the second software system.

As shown in FIG. 3a, the first software system such as a traditional component-based system comprises four components, namely component A, component B, component C and component D, among which component D invokes component A and component A invokes components B and C.

If component A of the first software system shown in FIG. 3a will be reused in the second software system such as an SCA-based software system with externalized dependencies, i.e. component A is a first component, then dependencies of component A need to be analyzed. As shown by arrows in FIG. 3b, component D depends on component A, and component A depends on components B and C. Therefore, the components component A depends on can be determined as components B and C, i.e. components B and C are second components.

As described previously, a first surrogate A' and a second surrogate A (blocks shown with dotted lines at the left side of FIG. 3c denote surrogates in the first operating environment) are generated for component A, and third surrogates B and C are generated respectively for components B and C. As shown in FIG. 3c, the generated surrogates are deployed in the first operating environment such as EJB and a second operating environment such as SCA runtime. In the first operating environment, the second surrogate A provides an interface of a second software system accessible protocol and surrogates the invocation to component A in the first operating environment. Specifically, the second surrogate A transforms an invocation of the second software system accessible protocol into an invocation of the first operating environment and forwards it to the interface of component A, thereby invoking component A for fulfilling needed functions. The interfaces and names of the third surrogates B and C are the same as those of original components B and C of the first software system. The interfaces provided by the third surrogates B and C are used for receiving invocation from component A and converting the invocation into an invocation of the second software system accessible protocol through protocol conversion, so that the invocation will be forwarded to the first surrogate A' deployed in the second software system. In fact, the first surrogate A' can be deemed as a component of the second software system, e.g. an SCA component. The first surrogate A' on the one hand provides services as an interface for invoking the selected first component(s) in the second software system, and on the other hand servers as an interface of the third surrogate corresponding to the second component in the first operating environment and thus demands services. Specifically, in the second software system, the first surrogate A' receives an invocation of the second software system accessible protocol from other components of the second software system, e.g. component E, and redirects the invocation to the second surrogate A in the first operating environment. When component A needs to invoke components B and C in its execution, the first surrogate A' receives the converted invocations of the second software system accessible protocol from the third surrogate B and the third surrogate C, which are in place of component B and component C respectively, and redirects the invocations to the components of the second software system, e.g. components F and G in this example. Generally, similar to components B and C of the first software system in terms of function, components F and G of the second software system can provide the services component A depends on.

Therefore, the group consisting of component A, the first surrogate A', the second surrogate A, the third surrogate B and the third surrogate C enable component A to be reused in the second software system without additional code or modifying implementation code of component A.

FIGS. 4a-4c show an example of selecting multiple first components from a first software system so as to reuse them in a second software system according to an embodiment of the present invention. FIG. 4a schematically shows an example of the first software system; FIG. 4b identifies the multiple first components as selected and second components they depend on; and FIG. 4c schematically shows a procedure of reusing the multiple first components in the second software system.

As shown in FIG. 4a, the first software system such as a traditional component-based system comprises five components, namely component A, component B, component C, component D and component E, among which component E invokes component A and component B, component A invokes component C, and component B invokes component D.

If component A and component B of the first software system shown in FIG. a is required to be reused in the second software system such as an SCA-based software system with externalized dependencies, i.e. component A and component B are first components, then dependencies of component A and dependencies of component B need to be analyzed. As shown by arrows in FIG. 4b, component E depends on component A and component B, component A depends on component C, and component B depends on component D. Therefore, components which component A and component B depend on can be determined as components C and D, i.e. components C and D are second components.

As described previously, a first surrogate A&B' and a second surrogate A&B are generated for components A and B, and third surrogates C and D are generated for components C and D respectively (blocks shown with dotted lines at the left side of FIG. 4c denote surrogates in a first operating environment). As shown in FIG. 4c, the generated surrogates are deployed in the first operating environment such as EJB and a second operating environment such as SCA runtime. In the first operating environment, the second surrogate A&B provides an interface of a second software system accessible protocol and surrogates invocations to components A and B in the first operating environment. Specifically, the second surrogate A&B converts a invocation of the second software system accessible protocol into an invocation of the first operating environment and forwards it to the interfaces of components A and B, thereby invoking components A and B for fulfilling needed functions. The interfaces and names of the third surrogates C and D are the same as those of original components C and D of the first software system. The interfaces provided by the third surrogates C and D are used for receiving an invocation from component A and converting the invocation into an invocation of the second software system accessible protocol through protocol conversion, so that the invocation will be forwarded to the first surrogate A&B' deployed in the second software system. In fact, the first surrogate A&B' can be deemed as a component of the second software system, e.g. an SCA component. The first surrogate A&B' on the one hand provides services as an interface for invoking the selected first components in the second software system, and on the other hand servers as an interface of the third surrogate corresponding to the second component in the first operating environment and thus demands services. Specifically, in the second software system, the first surrogate A&B' receives an invocation of the second software system accessible protocol to components A and B from other components of the second software system, e.g. component E, and redirects the invocation to the second surrogate A&B in the first operating environment. When components A and B need to invoke components C and D in their execution, the first surrogate A&B' receives the converted invocations of the second software system accessible protocol from the third surrogate C and the third surrogate D, which are in place of component B and component C respectively, and redirects them to the components of the second software system, e.g. components F and G in this example. Generally, similar to components C and D of the first software system in terms of function, components F and G of the second software system can provide the services which component A and component B depends on.

Therefore, the group consisting of components A and B, the first surrogate A&B', the second surrogate A&B, the third surrogate C and the third surrogate D enable components A and B to be reused in the second software system without additional code or modifying implementation code of component A or component B.

From the above specific example, it can be appreciated that in the case of multiple first components to be reused, only adding additional interfaces associated with those first components into the first and second surrogates is needed. Actually, according to the present invention, how to select the first component(s) of the first software system will not constitute any limitation to the present invention.

In each of the above-described examples, with respect to the selected first components of the first software system, there are the second components which they depend on. In fact, a much simpler case is that there is no second component which the selected first components of the first software system depend on. Those skilled in the art should appreciate that in this case, the third surrogates only provide interfaces for the redirection to the first surrogate of said second software system and the invoking procedure among surrogates and components is similar to the above-described procedure.

In order to carry out the solution of the present invention, information on interfaces invoking the first components and information of interfaces referenced by the first components are necessary. The information on these interfaces can be acquired through the analyzing step. Moreover, a common invocation mechanism between a first surrogate and relevant surrogates (second and third surrogates) is needed. For example, if the first software system is an EJB system and the second software system is an SCA-based software system, then the common invocation mechanism can be implemented using Web service, i.e. serve as an agent for protocol conversion between the first software system and the second software system. According to these interfaces and the common invocation mechanism, relevant surrogates can be generated. Through the foregoing description, each of the surrogates according to the present invention comprises adapters for invocation conversion, just as shown by circular marks in the surrogates of FIGS. 3c and 4c. Each adapter is used for receiving one type of invocations, protocol-converting them to another type and forwarding them. According to an embodiment of the present invention, in the case that the first software system is an EJB system and the second software system is an SCA-based software system, four types of adapters might be preferred, just as shown in FIG. 5. According to this embodiment, the second surrogate comprises an adapter for converting Web service invocations into EJB invocations (adapter a); the third surrogate comprises an adapter for converting EJB invocations into Web service invocations (adapter b); and the first surrogate comprises an adapter for converting SCA-supported invocations into Web service invocations on the one hand (adapter c) and an adapter for converting Web service invocation into SCA-supported invocations on the other hand (adapter d).

The inputs required for generating the adapters are as follows: interface definition; left-side invocation mechanism; and right-side invocation mechanism.

Adapter a (Web service->EJB) comprised by the second surrogate will be used as an example to specify how to implement the adapter.

The code skeleton is generated according to the interface definition and following the left-side invocation mechanism. In this instance, a Web service skeleton needs to be generated. There are many existing tools that can be leveraged.

```
Public class orderService {
    Public String createOrder (String order_in){
    }
}
```

In each operation, the invocation mechanism at the right side is followed to locate the component and invocate the corresponding method. In this instance, the JNDI name of the EJB is used to locate the EJB and then invoke the corresponding method.

```
Public class orderService {
    Public String createOrder (String order_in){
        String confirm_out;
        InitialContext ic = new InitialContext( );
        orderLocalHome oih = (OrderLocalHome) ic.lookup
        ("java:comp/env/EJB/order");
        OrderLocal order = oih.create( );
        confirm_out = order.createOrder(order_in)
        return confirm_out;
    }
}
```

FIG. 6 schematically shows a computer device in which the embodiments according to the present invention may be implemented.

The computer system shown in FIG. 6 comprises a CPU (Central Processing Unit) 601, a RAM (Random Access Memory) 602, a ROM (Read Only Memory) 603, a system bus 604, a Hard Disk controller 605, a keyboard controller 606, a serial interface controller 607, a parallel interface controller 608, a display controller 609, a hard disk 610, a keyboard 611, a serial external device 612, a parallel external device 613 and a display 614. Among these components, connected to system bus 604 are CPU 601, RAM 602, ROM 603, HD controller 605, keyboard controller 606, serial interface controller 607, parallel interface controller 608 and display controller 609. Hard disk 610 is connected to HD controller 605, and keyboard 611 to keyboard controller 606, serial external device 612 to serial interface controller 607, parallel external device 613 to parallel interface controller 608, and display 614 to display controller 609.

The functions of each component in FIG. 6 are well known in the art, and the architecture shown in FIG. 6 is conventional. Such architecture applies to not only personal computers but also hand held devices such as Palm PCs, PDAs (personal data assistants), mobile telephones, etc. In different applications, some components may be added to the architecture shown in FIG. 6, or some of the components shown in FIG. 6 may be omitted. The whole system shown in FIG. 6 is controlled by computer readable instructions, which are usually stored as software in hard disk 610, EPROM or other non-volatile memory. The software can also be downloaded from the network (not shown in the figure). The software, either saved in hard disk 610 or downloaded from the network, can be loaded into RAM 602, and executed by CPU 601 for implementing the functions defined by the software.

As the computer system shown in FIG. 6 is able to support the solution of reusing components of a component-based software system according to the present invention, the computer system merely serves as an example of computer systems. Those skilled in the art may understand that many other computer system designs are also able to carry out the embodiments of the present invention.

The present invention may further be implemented as a computer program product used by, for example the computer system shown in FIG. 6, which contains code for reusing components of a component-based software system according to the present invention. The code may be stored in a memory of other computer system prior to the usage. For instance, the code may be stored in a hard disk or a removable memory like an optical disk or a floppy disk, or may be downloaded via the Internet or other computer network.

As the embodiments of the present invention have been described with reference to the accompanying drawings, various modifications or alterations may be made by those skilled in the art within the scope as defined by the appended claims.

What is claimed is:

1. A component reuse method comprising the steps of:
analyzing a first software system, determining dependencies of at least one first component of said first software system and acquiring interface information, said at least one first component to be reused in a second software system, said first software system being a component-based software system operating in a first operating environment; and
generating surrogates which are deployed in said first operating environment and in the second software system respectively based on said dependencies and said interface information, said surrogates allowing said second software system to invoke services provided by said at least one first component in said first operating environment and allowing said at least one first component to invoke services provided in said second software system, said generating said surrogates including a step of: generating a first surrogate which is associated with said at least one first component and which is deployed in said second software system, a second surrogate which is associated with said at least one first component and which is deployed in said first operating environment, said first surrogate allowing invocations from said second software system to said at least one first component to be redirected to said second surrogate, and said second surrogate allowing invocations to said at least one first component, and a third surrogate which is associated with a second component that said at least one first component depends on, and which is deployed in said first operating environment, said first surrogate serving as an interface of said third surrogate associated with said second component in said first operating environment, said third surrogate allowing invocations from said at least one first component to said first surrogate so that said first surrogate redirects the invocations from said at least one first component to a corresponding component of said second software system.

2. The method according to claim 1, further comprising the step of: determining in said first software system second components on which said at least one first component depends, and acquiring information on interfaces for invoking said at least one first component and information on an interface referenced by said at least one first component.

3. The method according to claim 2, further comprising the step of: packaging said at least one first component, said first surrogate, said second surrogate and said third surrogates to generate packages for deployment.

4. The method according to claim 1, wherein said second software system is an SCA-based software system.

5. The method according to claim 1, wherein said first operating environment is an EJB operating environment, and said second software system being a software system operating in a second operating environment, which is an SCA runtime operating environment.

6. The method according to claim 5, comprising the steps of:
generating an adapter for converting SCA-supported invocations into Web service invocations and an adapter for converting Web service invocations into SCA-supported invocations, which above two adapters are comprised by said first surrogate;

generating an adapter comprised by said second surrogate and for converting Web service invocations into EJB invocations; and generating an adapter comprised by said third surrogates and for converting EJB invocations into Web service invocations.

7. The method according to claim 1, wherein said at least one first component comprises any component set selected from components of the first software system.

8. A system of supporting component reuse, comprising:

a component selector selecting from a first software system at least one first component that is reused in a second software system, said first software system being a component-based software system operating in a first operating environment and said second software system being a software system operating in a second operating environment with externalized dependencies;

an analyzer analyzing said first software system, determining dependencies of said at least one first component of said first software system and acquiring interface information;

a generator generating surrogates which are deployed in said first operating environment and in said second software system respectively based on said dependencies and said interface information, said surrogates allowing said second software system to invoke services provided by said at least one first component in said first operating environment and allowing said at least one first component to invoke services provided in said second software system, said generating said surrogates including a step of: generating a first surrogate which is associated with said at least one first component and which is deployed in said second software system, a second surrogate which is associated with said at least one first component and which is deployed in said first operating environment, said first surrogate allowing invocations from said second software system to said at least one first component to be redirected to said second surrogate, said second surrogate allowing invocations to said at least one first component, and a third surrogate which is associated with a second component said at least one first component depending on, and which is deployed in said first environment, said first surrogate serving as an interface of said third surrogate associated with said second component in said first operating environment, said third surrogate allowing invocations from said at least one first component to said first surrogate so that said first surrogate redirects the invocations from said at least one first component to a corresponding component of said second software system.

9. The system according to claim 8, wherein said analyzer is further configured for determining in said first software system second components on which said at least one first component depends, and acquiring information on interfaces for invoking said at least one first component and information on an interface referenced by said at least one first component.

10. The system according to claim 9, further comprising: a packager packaging said at least one first component, said first surrogate, said second surrogate and said third surrogates to generate packages for deployment.

11. The system according to claim 8, wherein said second software system is an SCA-based software system.

12. The system according to claim 8, wherein said first operating environment is an EJB operating environment, and said second operating environment is an SCA runtime operating environment.

13. The system according to claim 12, wherein said generator is further configured for:

generating an adapter for converting SCA-supported invocations into Web service invocations and an adapter for converting Web service invocations into SCA-supported invocations, which above two adapters are comprised by said first surrogate;

generating an adapter comprised by said second surrogate and for converting Web service invocations into EJB invocations; and generating an adapter comprised by said third surrogates and for converting EJB invocations into Web service invocations.

14. The system according to claim 8, wherein said at least one first component comprises any component set selected from components of the first software system.

15. A computer program product including a storage device readable by a processing circuit and storing computer-readable instructions for execution by the processing circuit for performing a method for reusing at least one first component that is selected from a software system to a second software system, wherein said first software system is a component-based software system operating in a first operating environment and said second software system is a software system operating in a second operating environment with externalized dependencies, said computer program product being configured to implement a method according to claim 1.

16. The system according to claim 9, wherein said third surrogates are surrogates representing said second components respectively, and said first surrogate has a same interface as said at least one first component.

17. The system according to claim 9, wherein said first surrogates are invoked by said third surrogates and redirect the invocations by third surrogates to components of said second software system which provide services referenced by said at least one first component.

* * * * *